(12) United States Patent
Li et al.

(10) Patent No.: US 10,604,038 B2
(45) Date of Patent: Mar. 31, 2020

(54) RECONFIGURABLE VEHICLE SEAT FOR CHILDREN

(71) Applicant: GM GLOBAL TECHNOLOGY OPERATIONS LLC, Detroit, MI (US)

(72) Inventors: Shifang Li, Shelby Township, MI (US); Yiran Hu, Shelby Township, MI (US); Carl W. Wellborn, Detroit, MI (US); Joseph Neighbors, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 66 days.

(21) Appl. No.: 15/987,292

(22) Filed: May 23, 2018

(65) Prior Publication Data
US 2019/0359094 A1 Nov. 28, 2019

(51) Int. Cl.
*B60N 2/01* (2006.01)
*B60N 2/30* (2006.01)
*B60N 2/16* (2006.01)
*B60N 2/28* (2006.01)

(52) U.S. Cl.
CPC ............. *B60N 2/3084* (2013.01); *B60N 2/01* (2013.01); *B60N 2/16* (2013.01); *B60N 2/28* (2013.01)

(58) Field of Classification Search
CPC .. B60N 2/3084; B60N 2/3081; B60N 2/3086; B60N 2/01; B60N 2/16; B60N 2/28; B60N 2/26
USPC ................................. 297/112, 188.04–188.06
See application file for complete search history.

(56) References Cited

U.S. PATENT DOCUMENTS

| 4,756,573 A * | 7/1988 | Simin ................... | B60N 2/3084 297/117 |
| 4,936,627 A * | 6/1990 | Guim ................... | B60N 2/3084 297/238 |
| 5,409,293 A * | 4/1995 | Nagasaka ................ | B60N 2/26 297/105 |
| 5,472,260 A * | 12/1995 | Czapski ............... | B60N 2/3084 297/112 |
| 5,775,771 A * | 7/1998 | La Cour .............. | B60N 2/3084 297/188.04 |
| 6,626,492 B1 * | 9/2003 | Uno ........................ | B60N 2/265 297/238 |
| 7,070,239 B1 * | 7/2006 | Ugrekhelidze ...... | B60N 2/3084 297/105 |
| 7,458,635 B2 * | 12/2008 | Mendis .................. | B60N 2/206 297/112 |

(Continued)

*Primary Examiner* — Mark R Wendell
(74) *Attorney, Agent, or Firm* — Harness, Dickey & Pierce, P.L.C.

(57) ABSTRACT

A seat for at least one occupant of a vehicle includes a seat cushion, a back, and a first side component. The seat cushion has a front end, a back end, and a longitudinal axis extending through the front and back ends. The seat cushion includes a rear portion and a front portion. The rear portion is disposed at the back end and includes a first top surface that is configured to engage the occupant. The front portion is disposed at the front end. At least one of the front and rear portions is configured to move along the longitudinal axis with respect to the other of the front and rear portions. The back is disposed at the back end of the seat cushion. The first side component is coupled to the back. The first side component is configured to move between a stowed configuration and a use configuration.

20 Claims, 5 Drawing Sheets

(56) References Cited

U.S. PATENT DOCUMENTS

| | | | |
|---|---|---|---|
| 7,517,016 B1* | 4/2009 | West | B60N 2/832 |
| | | | 297/236 |
| 7,871,124 B1* | 1/2011 | Hinds | B60N 2/2806 |
| | | | 297/234 |
| 9,290,114 B2* | 3/2016 | Herut | B60N 2/2878 |
| 9,676,305 B2* | 6/2017 | Gujarathi | B60N 2/32 |
| 2008/0100109 A1* | 5/2008 | Frank | B60N 2/3081 |
| | | | 297/238 |
| 2009/0051188 A1* | 2/2009 | Foussianes | B60N 2/002 |
| | | | 296/65.01 |
| 2010/0156133 A1* | 6/2010 | Bhatia | B60N 2/366 |
| | | | 296/65.09 |
| 2012/0119479 A1* | 5/2012 | Parker | B60N 2/2809 |
| | | | 280/807 |
| 2014/0265484 A1* | 9/2014 | Elharar | B60N 2/28 |
| | | | 297/232 |
| 2015/0258921 A1* | 9/2015 | Chung | B60N 2/2821 |
| | | | 297/256.16 |
| 2017/0120779 A1 | 5/2017 | Decaluwe et al. | |

\* cited by examiner

RECONFIGURABLE VEHICLE SEAT FOR CHILDREN

INTRODUCTION

The present disclosure relates to a reconfigurable vehicle seat for children, and more particularly, to a vehicle seat that can accommodate an adult, a child in a safety seat, or both a child in a booster seat and another child in a safety seat.

This section provides background information related to the present disclosure which is not necessarily prior art.

Vehicles typically include one or more rows of rear seats. Each seat can support one occupant. A passenger, such as an adult, may sit directly on the seat. Alternatively, the seat may be used to support a child safety seat. There are various different kinds of child safety seats, such as infant car seats, booster seats for larger children, and all-in-one car seats that are adjustable to accommodate children of different sizes, heights, and weights, by way of example.

SUMMARY

This section provides a general summary of the disclosure, and is not a comprehensive disclosure of its full scope or all of its features.

In various aspects, the present disclosure provides a seat for at least one occupant of a vehicle. The seat includes a seat cushion, a back, and a first side component. The seat cushion has a front end and a back end and a longitudinal axis extending through the front end and the back end. The seat cushion includes a rear portion and a front portion. The rear portion is disposed at the back end. The rear portion includes a first top surface that is configured to engage the occupant. The front portion is disposed at the front end. At least one of the rear portion and the front portion is configured to move along the longitudinal axis with respect to the other of the rear portion and the front portion. The back is disposed at the back end of the seat cushion. The first side component is coupled to the back. The first side component is configured to move between a stowed configuration and a use configuration.

In one aspect, the rear portion further includes a bottom surface opposite the first top surface. The front portion includes a second top surface facing the bottom surface of the rear portion.

In one aspect, the second top surface is configured to engage a base of a child seat.

In one aspect, the front portion includes a support and a projection. The support includes the second top surface. The projection extends upward from the support. The front portion is configured to move between a closed configuration and an extended configuration. In the closed configuration, the projection abuts the rear portion. In the extended configuration, the projection and the rear portion are spaced apart.

In one aspect, the first top surface defines a first length parallel to the longitudinal axis. The projection includes a third top surface. The third top surface defines a second length parallel to the longitudinal axis. The second length is 50%-100% of the first length.

In one aspect, a distance of about 5-12 inches is defined between the projection and the rear portion in the extended configuration.

In one aspect, the seat further includes a seatbelt component that is at least partially recessed with respect to the first top surface.

In one aspect, the back includes a front surface. The front surface is configured to engage the occupant. The front surface defines a cavity. In the stowed configuration, the first side component is at least partially disposed in the cavity. In the use configuration, the first side component extends toward the front end of the seat cushion.

In one aspect, in the use configuration, the first side component engages the rear portion of the seat cushion.

In one aspect, in the use configuration, the first side component and the rear portion of the seat cushion are spaced In one aspect, the seat further includes a second side component. The second side component is coupled to the back. The second side component is configured to move between the stowed configuration and the use configuration. The first side component and the second side component are disposed on opposite sides of the back.

In one aspect, the vehicle has a floor. The rear portion of the seat cushion is configured to move between a first height with respect to the floor of the vehicle and a second height with respect to the floor. The second height is greater than the first height.

In one aspect, a vehicle cabin includes the seat and two additional seats. The seat is disposed between the two additional seats.

In one aspect, the back is configured to move along the longitudinal axis between an aligned position and an adjusted position. In the aligned position, the back of the seat is substantially aligned with backs of the additional seats with respect to the longitudinal axis. In the adjusted position, the back of the seat is disposed at least partially behind the backs of the additional seats.

In one aspect, in the adjusted position, the back of the seat is disposed completely behind the backs of the additional seats.

In other aspects, the present disclosure provides seat for at least one occupant of a vehicle. The seat includes a seat cushion and a back. The seat cushion has a front end, a back end, and a longitudinal axis extending through the front end and the back end. The seat cushion includes a rear portion and a front portion. The rear portion is disposed at the back end. The front portion is disposed at the front end. The front portion includes a support and a projection. The projection extends upward from the support. The front portion is configured to move along the longitudinal axis with respect to the rear portion between a closed configuration and an extended configuration. The back is disposed at the back end of the seat cushion. In the closed configuration, the support is disposed below the rear portion and the projection abuts the rear portion. In the extended configuration, the projection is spaced apart from the rear portion to define a gap of 5-12 inches.

In one aspect, the rear portion includes a first top surface and a bottom surface opposite the first top surface. The support includes a second top surface facing the bottom surface. The projection includes a third top surface. The first top surface defines a first length parallel to the longitudinal axis. The third top surface defines a second length parallel to the longitudinal axis. The second length is 50%-100% of the first length.

In one aspect, the support is configured to engage a base of a child seat.

In yet other aspects, the present disclosure provides a row of seats for a cabin of a vehicle. The row of seats includes a first seat, a second seat, and a third seat. The first seat includes a seat cushion and a back. The seat cushion has a front end, a back end, and a longitudinal axis extending through the front end and the back end. The seat cushion includes a rear portion disposed at the back end and a front portion disposed at the front end. The front portion is configured to move away from the rear portion along the longitudinal axis and the rear portion is configured to move away from the front portion along the longitudinal axis. The back is disposed at the back end of the seat cushion. The first seat is disposed laterally between the second seat and the third seat.

In one aspect, the back of the seat cushion is configured to move along the longitudinal axis between an aligned position and an adjusted position. In the aligned position, the back of the first seat is aligned with backs of the second and third seats with respect to the longitudinal axis. In the adjusted position, the back of the first seat is disposed at least partially behind the backs of the second and third seats.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A-2D are top views of a rear row of seats of the vehicle of FIG. 1.

FIGS. 3A-3B are partial perspective views of the rear row of seats of FIG. 2A.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Standard Vehicle Seats

As discussed above, a typical vehicle seat can accommodate a single passenger, such as an adult, or a child seated in a safety seat. An infant seat is generally coupled to the vehicle seat through a base. The base may be directly coupled to the vehicle seat. The infant seat may be removable from the base so that the infant can be carried out of the vehicle while in the seat. In contrast, a booster seat for larger children may be directly coupled to the seat without the use of a separate base.

In ride-share situations, the special equipment needed for children (e.g., an infant seat base, a booster seat) may not be readily available. When it is available, it may be time consuming to install, which is inconvenient for ride-shares. As a result, ride-sharing may be infeasible or unappealing for passengers traveling with one or more children who require safety seats. Furthermore, child safety seat equipment may be bulky and its use in a ride-share vehicle may lead to reduced personal space and/or discomfort for adjacent passengers.

Reconfigurable Vehicle Seat

In various aspects, the present disclosure provides a reconfigurable seat for a vehicle. The reconfigurable seat may be disposed between two other seats and may therefore be referred to as the center seat. By reconfiguring the center seat, the entire row of seats can be arranged to accommodate different types of passengers (e.g., providing additional personal space for unacquainted ride-share passengers), sizes of passengers (e.g., creating extra legroom for a tall adult or configuring the center seat into a booster seat for a child), and quantities of passengers (e.g., configuring the center seat so that it can accommodate two children).

Figure 2A:
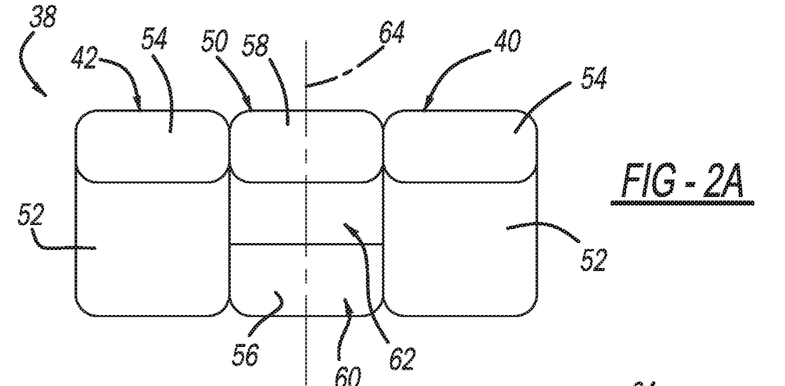
FIG. 2A shows the rear row of seats in a standard arrangement such as to accommodate three adults.
Figures 2B, 2C:
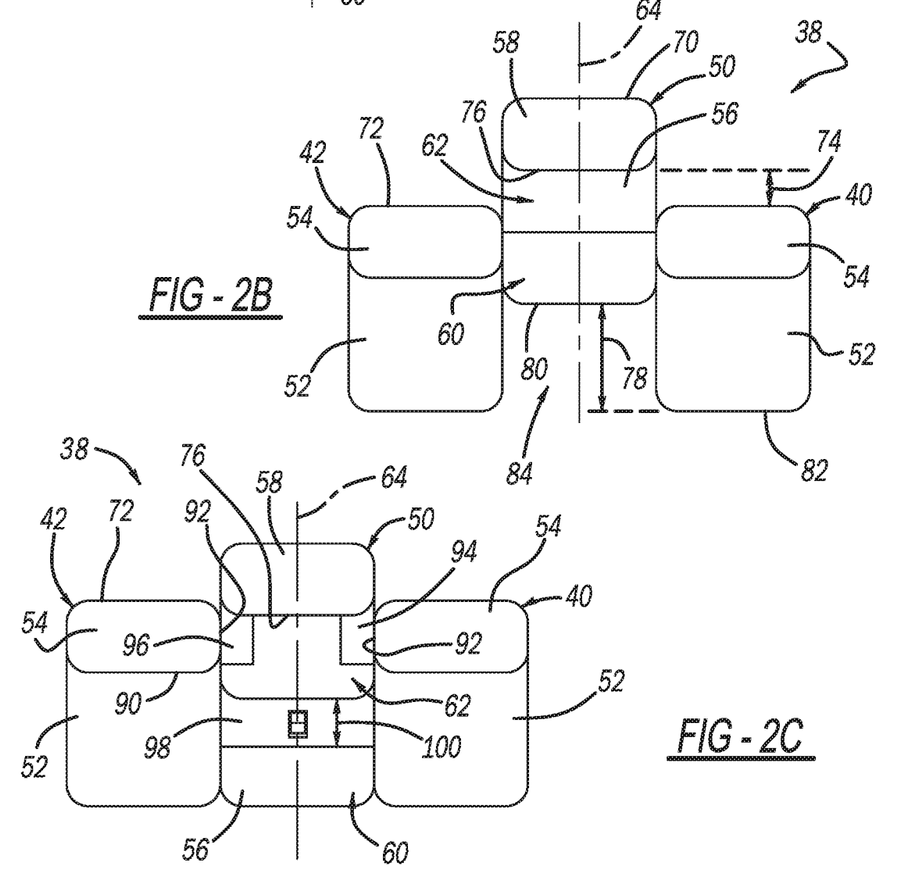
FIG. 2B shows the rear row of seats in a discrete arrangement that creates extra shoulder space and legroom in a center seat.
FIG. 2C shows the rear row of seats in a booster configuration so that the center seat can accommodate a child.
Figures 2D, 3A:
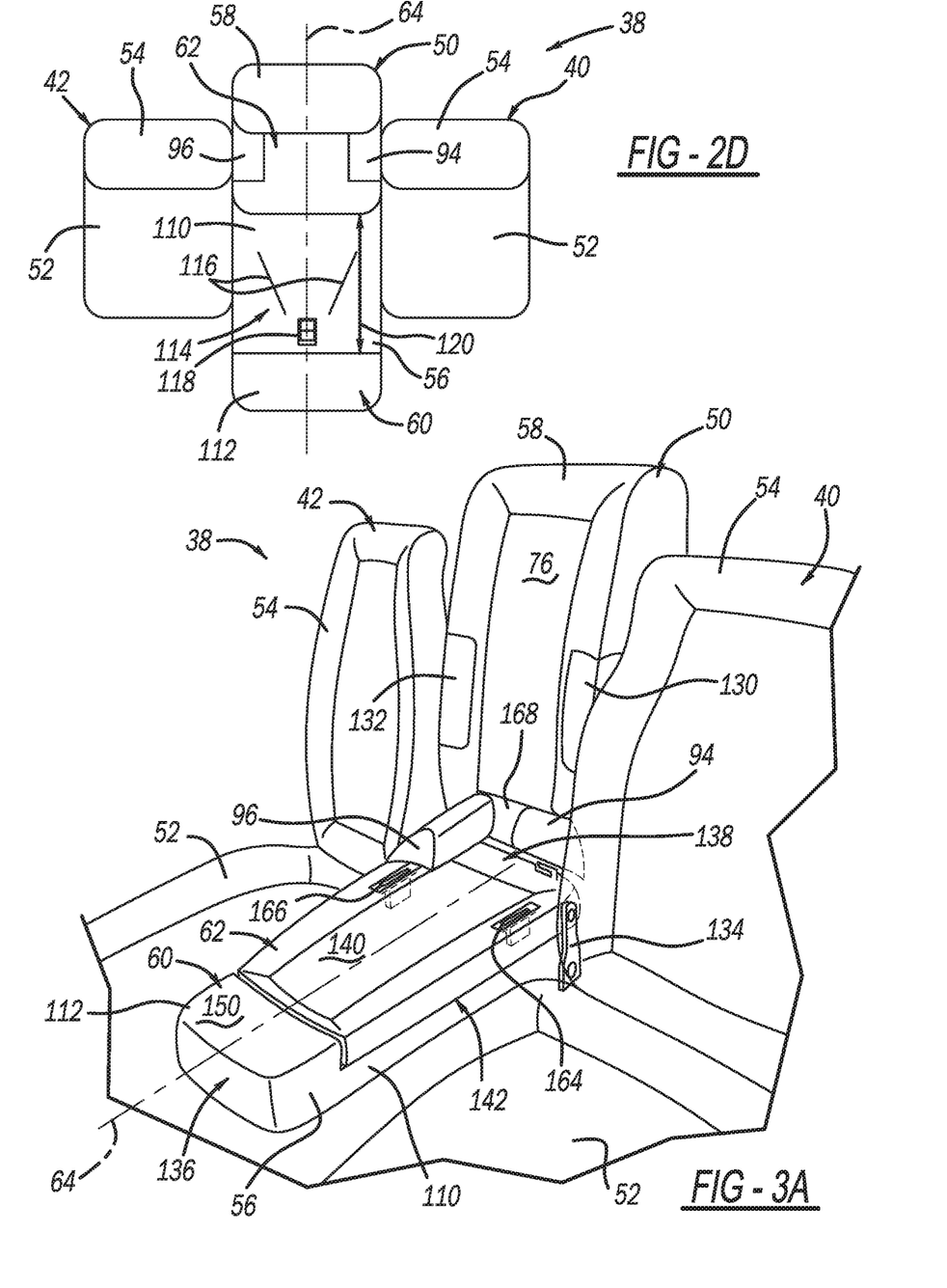
FIG. 2D shows the rear row of seats in a two-child arrangement such that a rear portion of the seat can be configured as a booster seat to support a child and a front portion of the seat can be coupled to a base of a separate child seat.
FIG. 3A shows the row of seats in transition between the standard arrangement and the booster arrangement.

The row of seats including the reconfigurable center seat can be configured in: (1) a standard arrangement (FIG. 2A); (2) a discrete arrangement (FIG. 2B); (3) a booster arrangement (FIGS. 2C, 3B); and (4) a two-child arrangement (FIGS. 2D, 4). In the standard arrangement, each of the seats is disposed at substantially the same height with respect to a floor of the vehicle and substantially the same longitudinal position. In the discrete arrangement, the center seat is translated rearward to create more space surrounding each seat in the row. In the booster arrangement, the center seat is reconfigured to be a booster seat for a child who is too small to use the seat in the standard arrangement. In the two-child arrangement, the center seat is reconfigured to accommodate two children. More particularly, a front portion of a seat cushion is coupled to a base of a child safety seat and a rear portion of the seat cushion is reconfigured as a booster seat.

Vehicle Including the Reconfigurable Vehicle Seat

Figure 1:
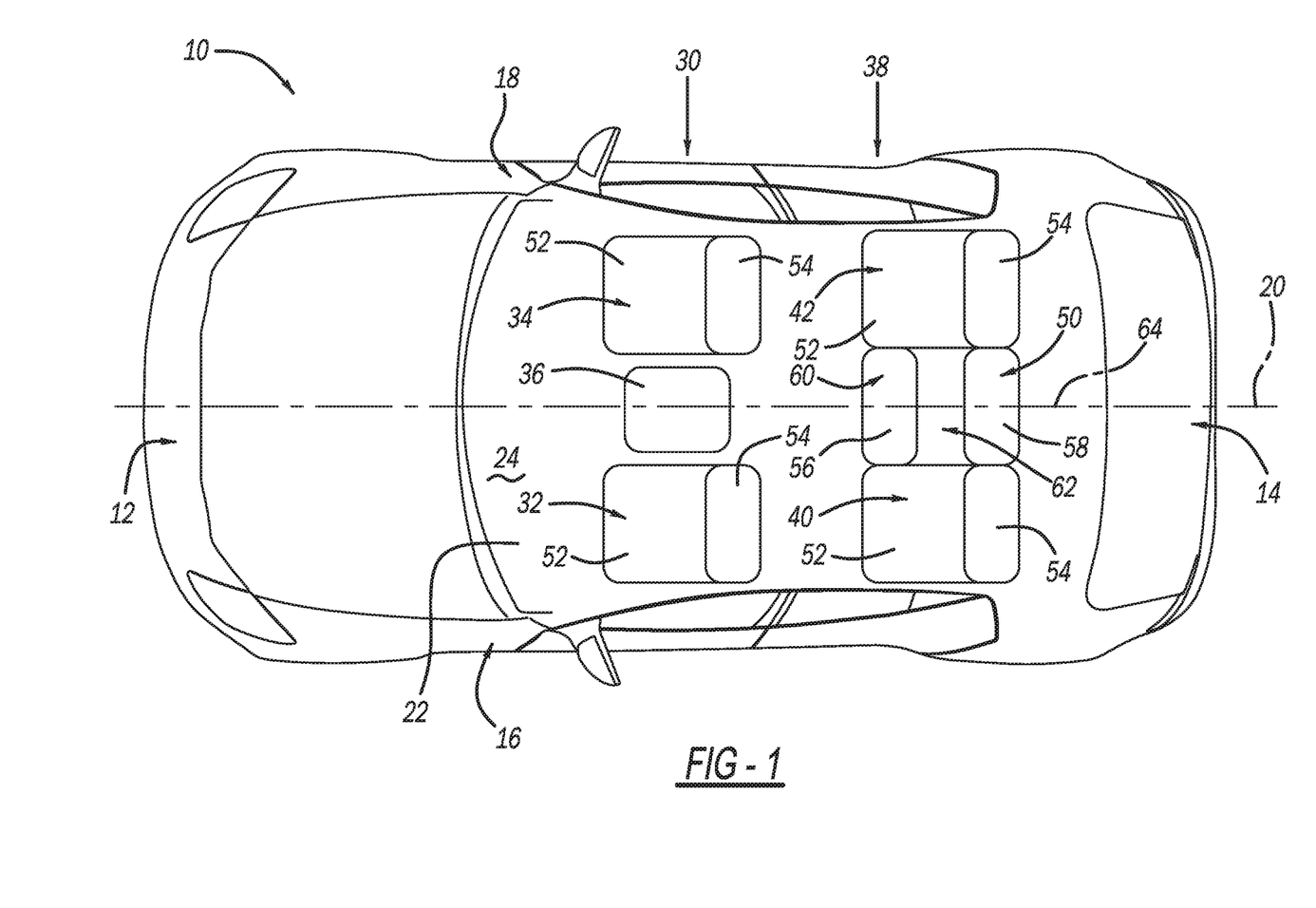
FIG. 1 is a plan view of a vehicle according to certain aspects of the present disclosure.

With reference to FIG. 1, a vehicle 10 according to certain aspects of the present disclosure is provided. The vehicle 10 may include a front end 12, a rear end 14, a first or driver side 16, and a second or passenger side 18. A longitudinal axis 20 of the vehicle 10 may extend through the front end 12 and the rear end 14. The vehicle 10 may further include a passenger cabin 22 having a floor 24.

A first or front row of seats 30 may be disposed in the passenger cabin 22 and may include a driver seat 32 and a front passenger seat 34. A console 36 may be disposed between the driver seat 32 and the front passenger seat 34. A second or rear row of seats 38 may also be disposed in the passenger cabin 22. The second row of seats 38 may include first and second side seats 40, 42 and a center seat 50. The center seat 50 (also referred to as a "first seat") may be disposed laterally between the first and second side seats 40, 42 (also referred to as "additional seats" or "second and third seats"). Each of the driver seat 32, the front passenger seat 34, and the side seats 40, 42 may include a seat cushion 52 and a back 54. One skilled in the art will appreciate that additional rows of seats may be provided. Furthermore, the rows of seats may include different quantities of seats.

The center seat 50 may include a seat cushion 56 and a back 58, each of which may be reconfigurable. The seat cushion 56 may include a front portion 60, a rear portion 62, and a longitudinal axis 64 that extends through the front portion 60 and the rear portion 62. The seat cushion 56 may define a depth substantially parallel to the longitudinal axis 64. The depth may be in a range of about 14-22 inches. The seat cushion 56 may define a width in a side-to-side direction (i.e., the direction substantially parallel to a transverse axis extending between the first and second sides 16, 18 of the vehicle 10). The width may be in a range of about 14-16 inches. The front portion 60 and the rear portion 62 may be movable with respect to one another along the longitudinal axis 64, as described in greater detail below. In various aspects, the longitudinal axis 64 of the seat cushion 56 is collinear with the longitudinal axis 20 of the vehicle 10. As described above, the rear row of seats 38, and more particularly the center seat 50, can be reconfigured to accommodate different type, sizes, and quantities of passenger. Four exemplary seating arrangements are shown in FIGS. 2A-2D.

Standard Arrangement

With reference to FIG. 2A, the rear row of seats 38 is shown in a first arrangement, referred to herein as a "standard" arrangement, without limiting the utility of this or other arrangements described herein. The seats 40, 42, 50 may be disposed next to one another in a lateral direction from the first or driver side 16 of the vehicle 10 to the second or passenger side 18 of the vehicle 10 (FIG. 1). The seats 40, 42, 50 may generally be aligned in a longitudinal direction (i.e., with respect to the longitudinal axis 20), except for minor seat position adjustments to accommodate passengers of different sizes. A position of the back 58 of the center seat 50 with respect to the backs 54 of the side seats 40, 42 may be described as "aligned." A position of the front portion 60 of the seat cushion 56 with respect to the rear portion 62 of the seat cushion 56 may be described as "closed." The seat cushion 56 may be disposed at a first height with respect to the floor 24 of the vehicle 10.

In the standard arrangement, each of the seats 40, 42, 50 in the rear row of seats 38 can support a single occupant, such as an adult seated on the respective seat cushion 52, 56, or a child seated in a safety seat that is coupled to the seat cushion 52, 56 (not shown). However, as discussed above, child safety seats may be bulky and adults sitting directly adjacent to child seats may be uncomfortable.

Discrete Arrangement

With reference to FIG. 2B, the rear row of seats 38 is shown in a discrete configuration. In the discrete configuration, the seats are not aligned with respect to the longitudinal axis 64. The center seat 50 may be disposed rearward (i.e., closer to the rear end 14 of the vehicle 10) of the first and second side seats 40, 42, at a different longitudinal position. More particularly, the back 58 of the center seat 50 may be disposed at least partially behind the backs 54 of the first and second side seats 40, 42. The seat cushion 56 may be disposed at the first height.

The center seat 50 may be movable between the position of FIG. 2A to the position of FIG. 2B. A position of the back 58 with respect to the adjacent backs 54 of the side seats 40, 42 may be described as "adjusted," and more particularly as "fully adjusted." In various aspects, the back 58 of the center seat 50 is disposed completely behind the backs 54 of the first and second side seats 40, 42. As used herein, "completely behind" means that (1) a first rear surface 70 of the seat back 58 of the center seat 50 is disposed rearward of second rear surfaces 72 of the seat backs 54 of the side seats 40, 42; and (2) a first distance or dimension 74 between a first front surface 76 of the seat back 58 of the center seat 50 and the rear surfaces 72 of the side seats 40, 42 is greater than or equal to 0 inches (≥0 inches), optionally greater than or equal to 1 inch (≥1 inch), optionally greater than or equal to 2 inches (≥2 inches), and optionally greater than or equal to 4 inches (≥4 inches). "Fully adjusted" refers to the position of the back 58 behind the backs 54 of the adjacent side seats 40, 42 and does not require the center seat 50 to be disposed at a maximum possible distance away from the aligned position.

A second distance or dimension 78 is defined between a forward-most point 80 on the seat cushion 56 of the center seat 50 and a forward-most point 82 on the seat cushions 52 of the first and second side seats 40, 42. The second distance 78 may be greater than or equal to about 5 inches, optionally greater than or equal to about 6 inches, optionally greater than or equal to about 7 inches, optionally greater than or equal to about 8 inches, optionally greater than or equal to about 9 inches, optionally greater than or equal to about 10 inches, optionally greater than or equal to about 11 inches, optionally greater than or equal to about 12 inches, optionally greater than or equal to about 13 inches, optionally greater than or equal to about 14 inches, and optionally greater than or equal to about 15 inches. In various alternative aspects, the second distance is greater than or equal to about 16 inches and less than or equal to about 17 inches. The front portion 60 of the seat cushion 56 may be in the closed configuration with respect to the rear portion 62 of the seat cushion 56.

The discrete arrangement of FIG. 2B provides additional space for passengers of each of the seats 40, 42, 50. The use of the discrete arrangement may therefore be particularly useful in situations where the rear row of seats 38 would otherwise be crowded. In one example, the center seat 50 is moved rearward when child safety seats are coupled to the first and second side seats 40, 42. A passenger seated on the center seat 50 may benefit from extra hip and shoulder space by being offset from the safety seats. Taller passengers may also benefit from extra legroom in an area 84 in front of the center seat 50. In another example, a child seat is installed on the center seat 50 and passengers are seated on the first and second side seats 40, 42. Similarly, the position of the center seat 50 results in additional hip and shoulder space for the passengers seated in the first and second side seats 40, 42. In yet another example, the vehicle is used for a carpool between unacquainted passengers who may wish to have additional personal space regardless of the presence or absence of child safety seats.

Booster Arrangement

Figure 3B:
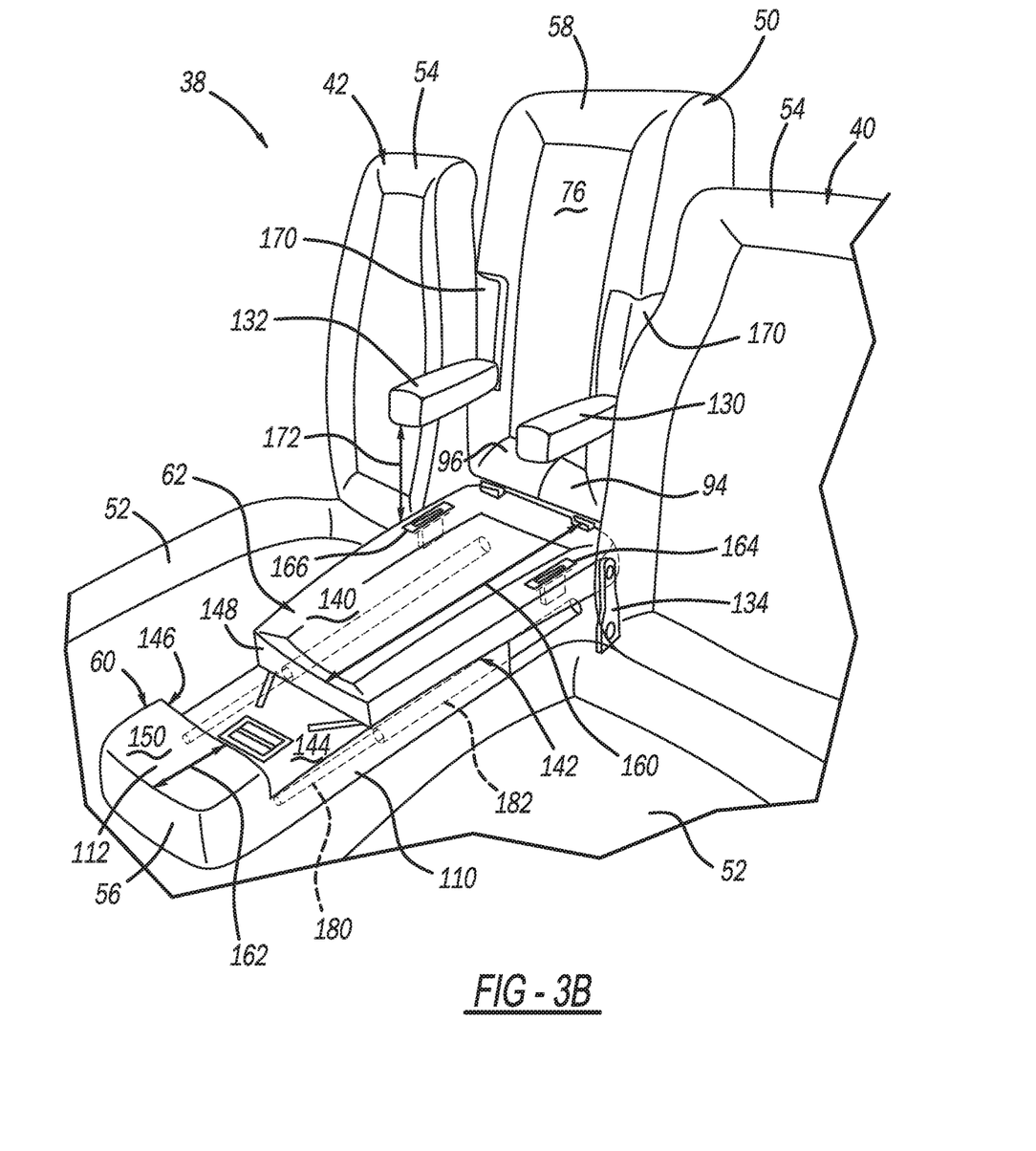
FIG. 3B shows row of seats in the booster configuration.
Figure 4:
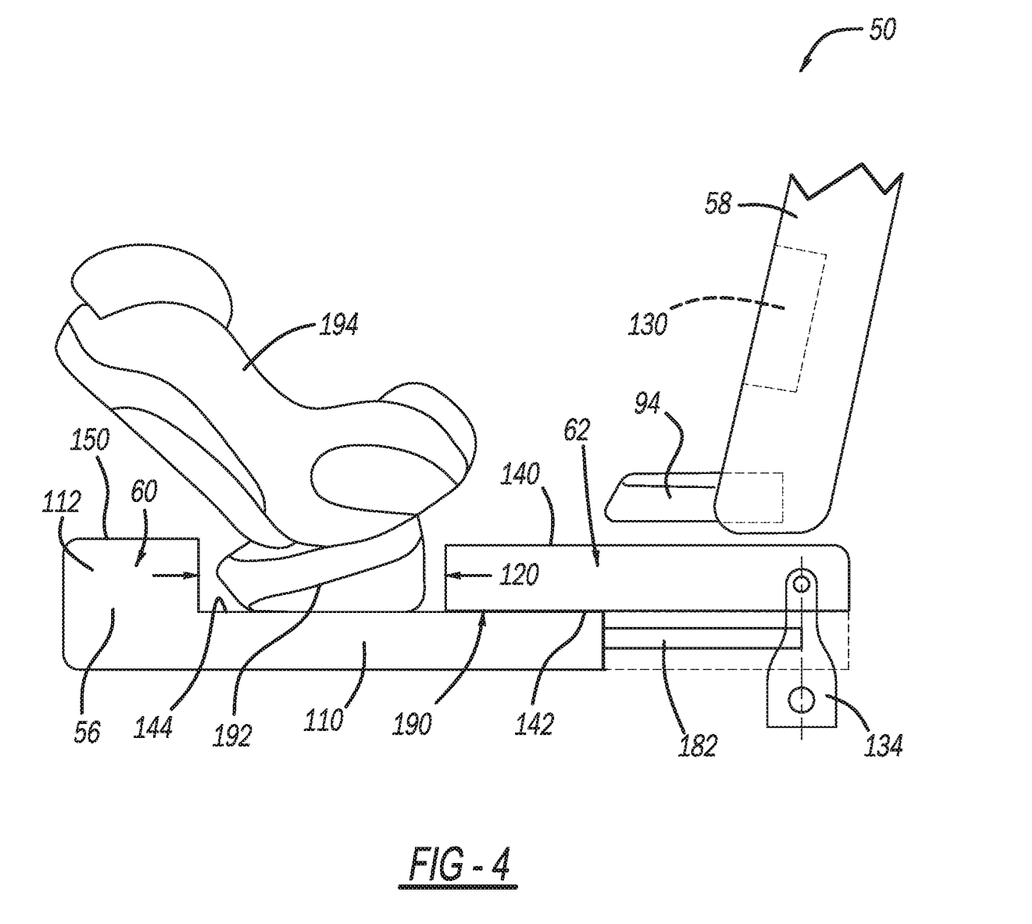
FIG. 4 is a side view of the center seat of the rear row of seats of FIG. 2D showing a child safety seat coupled to a front portion of the seat.

With reference to FIG. 2C, the rear row of seats 38 is shown in a booster arrangement (shown in greater detail in FIG. 3B). In the booster arrangement, the center seat 50 is reconfigured to accommodate a child who would otherwise be seated in a separate booster seat. The booster seat arrangement may advantageously eliminate the need for the separate booster seat for a child who is too small to be seated directly on a vehicle seat in the standard or discrete arrangements.

The back 58 of the center seat 50 may be disposed partially behind the backs 54 of the side seats 40, 42. As used herein, "partially behind" means that the first front surface 76 of the back 58 of the center seat 50 is disposed longitudinally between second front surfaces 90 and second rear surfaces 72 of the seat backs 54 of the first and second side seats 40, 42. In this intermediate longitudinal position, the inside surface 92 of the backs 54 of the first and second side seats 40, 42 may function as side shoulder shields for a child seated in the center seat 50. In various aspects a position of the back 58 may be referred to as "intermediate adjusted."

First and second lower side components 94, 96 may be pulled out from the back 58 of the center seat (as best shown in FIG. 3A). The lower side components 94, 96 may be used as side hip shields to reduce a width of the seat cushion 56 for a smaller child. The center seat 50 may further include pull-out arms rests (see, e.g., upper side components 130, 132 of FIG. 3B). A height of the center seat 50 may also be increased from the first height to a second height.

The seat cushion 56 may be configured to create a foot rest 98 for a child seated in the center seat 50. More specifically, at least one of the front portion 60 and the rear portion 62 of the seat cushion 56 may be translated along the longitudinal axis 64 away from the other one of the front portion 60 and the rear portion 62. In one example, the rear portion 62 moves rearward together with the back 58 and the front portion 60 remains unmoved. The rear portion 62 and the back 58 may alternatively move along the longitudinal axis 64 independent of one another. For example, when a greater seat cushion depth is preferred, the back 58 can be moved rearward along the longitudinal axis 64, the front portion 60 of the seat cushion 56 can be moved forward along the longitudinal axis 64, and the rear portion 62 of the seat cushion 56 remains unmoved. A position of the front portion 60 of the seat cushion 56 with respect to the rear portion 62 may be described as "extended," and more particularly as "intermediate extended."

The front portion 60 may move a third distance or dimension 100 between the closed configuration (FIGS. 2A-2B) and the intermediate extended configuration (FIG. 2C). In various aspects, the third distance 100 is greater than or equal to about 5 inches and less than or equal to about 12 inches (5-12 inches), optionally greater than or equal to about 6 inches and less than or equal to about 12 inches (6-12 inches), optionally greater than or equal to about 6 inches and less than or equal to about 10 inches (6-10 inches), and optionally greater than or equal to about 5 inches and less than or equal to about 10 inches (5-10 inches). In certain alternative aspects, the third distance 100 may be greater than about 14 inches.

Two-Child Arrangement

Referring to FIG. 2D, the rear row of seats 38 is shown in a two-child arrangement. In the two-child arrangement, the center seat 50 is configured to accommodate two children, such as a larger child requiring a booster seat and a smaller child requiring an infant seat. More particularly, the rear portion 62 of the seat cushion 56 of the center seat 50 may be configured as a booster seat to support the larger child. The front portion 60 of the seat cushion 56 may be configured to engage a base of a safety seat for the smaller child.

The back 58 of the center seat 50 may be in the intermediate extended position so that the backs 54 of the first and second side seats 40, 42 function as shoulder shields. The seat cushion 56 may be disposed at the second height with respect to the floor 24. Similar to the booster arrangements of FIG. 2C, the lower side components 94, 96 may act as hip shields and the upper side components (e.g., first and second upper side components 130, 132 of FIGS. 3A-3B) may be used as arm rests.

The seat cushion 56 may be configured to provide a shelf on which to couple a base of an infant seat (see, e.g., base 192 of FIG. 4). At least one of the front portion 60 and the rear portion 62 of the seat cushion 56 may be translated along the longitudinal axis 64 away from the other one of the front portion 60 and the rear portion 62, as described above in conjunction with FIG. 2C. A position of the front portion 60 with respect to the rear portion 62 may be referred to as "extended," and more particularly as "fully extended." As used herein, "fully extended" means that the front portion 60 and the rear portion 62 are separated enough to accommodate the safety seat base, and does not require the front portion 60 to be a maximum possible distance away from the rear portion 62.

The front portion 60 may include a support 110 and a projection 112. The projection 112 may extend upward (i.e., away from the floor 24) from the support 110. The support 110 may include a seat mounting assembly 114. In one example, the seat mounting assembly 114 includes a pair of alignment structures 116 and an anchoring structure 118. The alignment structures 116 may include rails, slots, bars, elongated anchors, or combinations thereof. The anchoring structure 118 can engage the base of the safety seat to couple the base to the front portion 60 of the seat cushion 56. One suitable example of the mounting assembly is described in U.S. patent application Ser. No. 15/343,525 (Filing Date: Nov. 4, 2016; Title: Child-Seat Mounting System; Inventors: Mary Decaluwe, Joseph Neighbors, Raymond A Beaufait, and William J. Ochalek), herein incorporated by reference in its entirety.

The front portion 60 may move a fourth distance or dimension 120 between the closed configuration of FIGS. 2A-2B and the fully extended configuration of FIG. 2D. In various aspects, the fourth distance 120 may be greater than or equal to about 10 inches and less than or equal to about 14 inches (10-14 inches), optionally greater than or equal to about 8 inches and less than or equal to about 12 inches (8-12 inches), and optionally greater than or equal to about 8 inches and less than or equal to about 10 inches (8-10 inches). In certain alternative aspects, the fourth distance 120 may be greater than about 16 inches.

In the two-child arrangement, the center seat 50 can accommodate two children, which expands the capacity of the rear row of seats 38 to up to four occupants when at least two of the occupants are children. The first and second side seats 40, 42 can accommodate two adults, two children in separate child safety seats, or one adult and one child in a separate child safety seat. The two-child arrangement therefore advantageously expands the capacity of a vehicle for personal use or ride-share by using available space in the center of the vehicle.

Summary of Rear Row Configurations

Table 1 below provides a summary of the seat arrangements described above. Back position refers to a position of the back 58 of the center seat 50 with respect to the backs 54 of the first and second side seats 40, 42. Front portion position refers to a position of the front portion 60 of the seat cushion 56 of the center seat 50 with respect to the rear portion 62 of the seat cushion 56 of the center seat 50.

TABLE 1

| FIG. | Rear Row Arrangement | Back Position | Front Portion Position |
|---|---|---|---|
| 2A | Standard | Aligned | Closed |
| 2B | Discrete | Adjusted: full | Closed |
| 2C | Booster | Adjusted: intermediate | Extended: intermediate |
| 2D | Two-Child | Adjusted: intermediate | Extended: full |

Rear Row Components and Details

Referring to FIGS. 3A-4, center seat 50 is shown in different stages of reconfiguration. In FIG. 3A, the rear row of seats 38 is in a transitional arrangement between the standard arrangement (FIG. 2A) and the booster arrangement (FIGS. 2C, 3B). The back 58 of the center seat 50 is in the intermediate adjusted configuration, the front portion 60 of the seat cushion 56 is in the closed configuration, the seat cushion 56 is at the second height, the first lower side component 94 is in a stowed configuration, the second lower side component 96 is in a use configuration, and first and second upper side components 130, 132 are in a stowed configuration. In FIG. 3B, the rear row of seats 38 is shown in the booster arrangement (also shown in FIG. 2C). The front portion 60 is in the intermediate extended configuration, the back 58 is in the intermediate adjusted configuration, the seat cushion 56 is at the second height, the lower side components 94, 96 are in the stowed configuration, and the upper side components 130, 132 are in the use configuration. In FIG. 4, the center seat 50 is shown in the two-child arrangement (also shown in FIG. 2D). The front portion 60 of the seat cushion 56 is in the fully extended configuration, the back 58 is in the intermediate adjusted configuration, the seat cushion 56 is at the second height, the lower side components 94, 96 are in the use configuration, and the upper side components 130, 132 are in the stowed configuration.

(i) Center Seat Attachment to Vehicle

As best shown in FIG. 3A, the seat cushion 56 is fixed to the vehicle 10. The seat cushion 56 is coupled to the vehicle 10 at the floor 24 (FIG. 1) or directly to a vehicle frame underneath the floor 24 (not shown), for example. The front portion 60 of the seat cushion 56 may include first frame components (not shown) and the rear portion 62 may include second frame components 134. The first frame components and the second frame components 134 may slidingly couple the front and rear portions 60, 62 of the seat cushion 56 to the floor 24 of the vehicle 10 so that they may independently translate along the longitudinal axis 64 of the seat cushion 56. In one example, the first and second frame components 134 engage tracks in the floor 24 (not shown).

(ii) Seat Cushion

The seat cushion 56 generally has a front end 136 and a back end 138. The longitudinal axis 64 extends through the front end 136 and the back end 138. The rear portion 62 of the seat cushion 56 may include a first top surface 140. The first top surface 140 may be configured to engage the occupant of the center seat 50. The rear portion 62 may further include bottom surface 142 that is disposed opposite the first top surface 140. The bottom surface 142 may face the floor 24 (FIG. 1) of the vehicle 10.

As discussed above, the front portion 60 of the seat cushion 56 may include the support 110 and the projection 112. The support 110 may be disposed at least partially under the rear portion 62 (i.e., closer to the floor 24) so that the rear portion 62 covers the front portion 60 as viewed from inside the cabin 22 (FIG. 1) of the vehicle 10. The support 110 may include a second top surface 144 (FIG. 3B) that faces the bottom surface 142 of the rear portion 62. In various aspects, the second top surface 144 is in communication with the bottom surface 142.

When the front portion 60 is in the closed configuration (FIG. 3A), the projection 112 may abut the rear portion 62. More particularly, an inside surface 146 (FIG. 3B) of the projection 112 may communicate with an outside surface 148 (FIG. 3B) of the rear portion 62. However, in various alternative aspects, in the closed configuration, the projection 112 does not directly communicate with the rear portion 62. That is, while "closed" can include a configuration in which there is no gap between the inside surface 146 and the outside surface 148, there may nonetheless be a small gap between the projection 112 and the rear portion 62 when the front portion 60 is in the closed configuration. The projection 112 may further include a third top surface 150. The third top surface 150 and the first top surface 140 may cooperate to support the occupant when the front portion 60 is in the closed configuration.

With reference to FIG. 3B, the first top surface 140 may define a first length 160. The third top surface 150 may define a second length 162. The second length 162 may be greater than or equal to about 50% to less than or equal to about 100% of the first length 160 (50%-100%), optionally greater than or equal to about 50% to less than or equal to about 90% of the first length 160 (50%-90%), and optionally greater than or equal to about 50% to less than or equal to about 80% of the first length 160 (50%-80%). In one example, the first length 160 is about 16 inches and the second length 162 is about 8 inches.

(iii) Restraint Devices

The seat cushion 56 may include first and second seatbelt components 164, 166. One of the first and second seatbelt components 164, 166 may include an extendable belt and a male portion of a buckle and the other of the seatbelt components 164, 166 may include a female portion of the buckle (not shown). The seatbelt components 164, 166 may be recessed inside of the rear portion 62 (i.e., from the first top surface 140) so that they do not interfere a larger passenger, such as an adult, seated directly on the first top surface 140. The seatbelt components 164, 166 may be separated by a distance that is less than a width of the seat cushion 56. Thus, they may be suitable for use by a smaller occupant, such as a child.

The center seat 50 may further include a standard shoulder-and-hip seatbelt (not shown). The standard seatbelt can be used by an adult, such as when the rear row of seats 38 is in the standard arrangement (FIG. 2A) or the discrete arrangement (FIG. 2B). The standard seatbelt may also be used by a smaller occupant in the booster configuration, for example, when the seat cushion 56 is disposed at the second height and a height of the standard seatbelt is fixed with respect to the floor 24. One skilled in the art will appreciate that the center seat 50 may include different or additional restraint systems, such as an over-the-shoulder child harness that is embedded in the first front surface 76 of the back 58 (not shown), by way of example.

(iv) Seat Back and Side Components

The back 58 of the center seat 50 may be disposed at the back end 138 of the seat cushion 56. In some aspects, the back 58 of the seat is movable with respect to the seat cushion 56. First and second lower side components 94, 96 and first and second upper side components 130, 132 may be coupled to the back 58. Although the center seat 50 is shown having both lower side components 94, 96 and upper side components 130, 132, the center seat 50 may alternatively be provided with a single pair of side components (e.g., the lower side components 94, 96 or the upper side components 130, 132).

The first and second lower side components 94, 96 may be independently movable between a stowed configuration and a use configuration. In the stowed configuration, the lower side components 94, 96 are disposed at least partially within a first cavity 168 (FIG. 3A) that is defined in the first front surface 76 of the back 58. The lower side components 94, 96 may be disposed on opposite sides of the back 58. The first and second lower side components 94, 96 may alternatively be disposed in multiple disconnected first cavities. In the use configuration, the lower side components 94, 96 may be disposed at least partially outside of the first cavity 168. The lower side components 94, 96 may engage the first top surface 140. In the use configuration, the lower side components 94, 96 may reduce a width of seat cushion 56 for use by a smaller occupant, such as a child. Therefore, as noted above, the lower side components 94, 96 can be used as hip side shields in the use configuration.

The first and second upper side components 130, 132 may be independently movable between a stowed configuration and a use configuration. In the stowed configuration, the upper side components 130, 132 are disposed at least partially within respective second cavities 170 (FIG. 3B). The upper side components 130, 132 may be disposed on opposite sides of the back 58. In the use configuration, the upper side components 130, 132 may be spaced apart from the first top surface 140 to define a gap. The gap may define a fifth dimension 172 (FIG. 3B) of greater than or equal to about 5 inches and less than or equal to about 7 inches (5-7 inches), optionally greater than or equal to about 6 inches and less than or equal to about 8 inches (6-8 inches), and optionally greater than or equal to about 7 inches and less than or equal to about 9 inches (7-9 inches). In certain aspects, the fifth dimension 172 may be greater than about 10 inches.

Each of the side components 94, 96, 130, 132 may extend in a substantially longitudinal direction (i.e., parallel to the longitudinal axis 20 of the vehicle 10) in the use configuration. In the stowed configuration, the first and second lower side components 94, 96 may extend in a substantially lateral direction (i.e., from side-to-side in the vehicle). In contrast, the first and second upper side components 130, 132 may extend in a substantially vertical direction (i.e., perpendicular to the floor 24 of the vehicle 10) in the stowed configuration. One skilled in the art will appreciate that the lower side components 94, 96 may alternatively be disposed vertically and/or the upper side components 130, 132 may alternatively be stowed laterally in the stowed configuration.

(v) Connectivity of Front and Rear Portions of the Seat Cushion

With reference to FIG. 3B, the front portion 60 of the seat cushion 56 may include a pair of rails 180. The rails 180 may be disposed at least partially inside the front portion 60 of the seat cushion 56. A pair of tracks 182 may be fixed with respect to the rear portion 62. The rails 180 may slidingly engage respective tracks 182. The rails 180 and the tracks 182 may each extend substantially parallel to the longitudinal axis 64 of the center seat 50.

As best shown in FIG. 4, the front and rear portions 60, 62 of the seat cushion 56 may always be at least partially overlapped in a longitudinal direction. For example, an overlap 190 between the front and rear portions 60, 62 may be greater than or equal to about 2 inches (≥2 inches), optionally greater than or equal to about 14 inches (≥14 inches), and optionally greater than or equal to about 16 inches (≥16 inches).

Child Safety Seat

A child safety seat assembly may coupled to the center seat 50, as shown in FIG. 4. The fourth distance 120 (i.e., between the projection 112 and the rear portion 62) may be increased beyond what is shown in FIG. 4 to provide space for the feet of a child seated in the rear portion 62. A safety seat base 192 is coupled to the front portion 60 of the seat cushion. More particularly, the base 192 is secured to the support 110 of the front portion 60 by the mounting assembly 114 (FIG. 2D). A child safety seat 194, which may be an infant seat, is coupled to the base 192. Although the child safety seat 194 is shown as being a rear-facing safety seat, other styles of child safety seats may be used within the scope of the present disclosure.

Alternative Arrangements

Although the reconfigurable seat is described as being the center seat 50 of the rear row of seats 38, other configurations are contemplated. In one example, each seat in a row is reconfigurable. The side seats may include alternate side shoulder shields instead of the backs of adjacent seats. An alternate side shoulder shield may be embedded in a recess of the seat back and movable into a side shield (similar to the any of the side components 94, 96, 130, 132, but oriented vertically rather than longitudinally in a use configuration). In another example, the reconfigurable seat may be a side seat having alternate side shoulder shields. A reconfigurable side seat may advantageously improve ease of access for assisting a child into the seat.

Method of Reconfiguration

In various aspects, the present disclosure provides a method of reconfiguring the center seat 50. To place the rear row of seats 38 into the booster arrangement, the method may include moving the back 58 rearward along the longitudinal axis 64 into the intermediate extended configuration. The method may further include raising the seat cushion 56 to the second height. The method may include partially separating the front portion 60 and the rear portion 62 to place the front portion 60 in the intermediate extended configuration. The front and rear portions 60, 62 can be partially separated by moving one or both of the front and rear portions 60, 62 along the longitudinal axis 64. The lower side components 94, 96 and/or the upper side components 130, 132 may be pulled out from the stowed configuration in the back 58 to the use configuration.

The center seat 50 can be further reconfigured to place the rear row of seats 38 in the two-child arrangement. More particularly, the front and rear portions 60, 62 can be fully separated by moving one or both of the front and rear portions 60, 62 along the longitudinal axis 64. The base 192 of the child seat can be coupled to the support 110 of the front portion 60. In one aspect, the front portion 60 can be fixed at any location between the closed configuration and the fully extended configuration. In another aspect, the front portion 60 can be fixed at predetermined fixed locations between the closed configuration and the fully extended configuration.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seat for at least one occupant of a vehicle, the seat comprising:
    a seat cushion having a front end, a back end, and a longitudinal axis extending through the front end and the back end, the seat cushion comprising:
        a rear portion disposed at the back end; and
        a front portion disposed at the front end, the front portion comprising a support and a projection extending upward from the support, at least one of the front portion and the rear portion being configured to translate along the longitudinal axis with respect to the other of the front portion and the rear portion between a closed configuration and an extended configuration; and
    a back disposed at the back end of the seat cushion, wherein:
    in the closed configuration, the support is disposed below the rear portion and the projection abuts the rear portion; and
    in the extended configuration, the projection is spaced apart from the rear portion to define a gap of 5-12 inches.

2. The seat of claim 1, wherein:
    the rear portion comprises a first top surface and a bottom surface opposite the first top surface, the support comprises a second top surface facing the bottom surface, and the projection comprises a third top surface;
    the first top surface defines a first length parallel to the longitudinal axis; and
    the third top surface defines a second length parallel to the longitudinal axis, the second length being 50%-100% of the first length.

3. The seat of claim 1, wherein the support is configured to engage a base of a child seat.

4. The seat of claim 1, wherein the front portion is configured to move with respect to the rear portion.

5. The seat of claim 1, further comprising a seatbelt component at least partially recessed into the rear portion.

6. The seat of claim 1, further comprising:
    a first side component coupled to the back and configured to move between a first stowed configuration and a first use configuration; and
    a second side component coupled to the back and configured to move between a second stowed configuration and a second use configuration, wherein the first side component and the second side component are disposed on opposite sides of the back.

7. The seat of claim 6, wherein:
    the back comprises a front surface configured to engage the occupant, the front surface defining a first cavity and a second cavity;
    in the first stowed configuration, the first side component is at least partially disposed in the first cavity; and
    in the second stowed configuration, the second side component is at least partially disposed in the second cavity.

8. The seat of claim 6, wherein the first side component and the second side component are spaced apart from the rear portion of the seat cushion to define a gap.

9. A seat for at least one occupant of a vehicle, the seat comprising:
    a seat cushion having a front end, a back end, and a longitudinal axis extending through the front end and the back end, the seat cushion comprising:
        a rear portion disposed at the back end, the rear portion comprising a first top surface configured to engage the occupant; and
        a front portion disposed at the front end, wherein at least one of the rear portion and the front portion is configured to move along the longitudinal axis with respect to the other of the rear portion and the front portion;
    a back disposed at the back end of the seat cushion; and
    a first side component coupled to the back, the first side component being configured to move between a first stowed configuration and a first use configuration, wherein in the first use configuration, the first side component engages the rear portion of the seat cushion.

10. The seat of claim 9, further comprising a second side component coupled to the back, the second side component being configured to move between a second stowed configuration and a second use configuration, wherein the second side component is spaced apart from the rear portion of the seat cushion to define a gap.

11. The seat of claim 9, wherein:
    the rear portion further comprises a bottom surface opposite the first top surface; and
    the front portion comprises a second top surface facing the bottom surface of the rear portion.

12. The seat of claim 11, wherein the second top surface is configured to engage a base of a child seat.

13. The seat of claim 11, wherein:
    the front portion comprises a support and a projection, the support comprising the second top surface and the projection extending upward from the support; and
    the front portion is configured to move between a closed configuration in which the projection abuts the rear portion and an extended configuration in which the projection and the rear portion are spaced apart.

14. The seat of claim 11, further comprising a seatbelt component at least partially recessed with respect to the first top surface.

15. The seat of claim 9, wherein:
    the back comprises a front surface configured to engage the occupant, the front surface defining a cavity;
    in the first stowed configuration, the first side component is at least partially disposed in the cavity; and
    in the first use configuration, the first side component extends toward the front end of the seat cushion.

16. The seat of claim 9, further comprising a second side component coupled to the back, the second side component being configured to move between a second stowed configuration and a second use configuration, wherein the first side component and the second side component are disposed on opposite sides of the back.

17. The seat of claim 9 for at least one occupant of a vehicle, the vehicle having a floor, wherein the rear portion of the seat cushion is configured to move between a first height with respect to the floor of the vehicle and a second height with respect to the floor, the second height being greater than the first height.

18. A row of seats for a cabin of a vehicle, the row of seats comprising:
    a first seat comprising:
        a seat cushion having a front end, a back end, and a longitudinal axis extending through the front end and the back end, the seat cushion comprising a rear portion disposed at the back end, and a front portion disposed at the front end, wherein the front portion is configured to move away from the rear portion along the longitudinal axis and the rear portion is configured to move away from the front portion along the longitudinal axis; and a first back disposed at the back end of the seat cushion;

a second seat; and a third seat, wherein the first seat is disposed laterally between the second seat and the third seat, wherein:

the first back of the seat cushion is configured to move along the longitudinal axis between an aligned position and an adjusted position;

in the aligned position, the first back of the first seat is aligned with a second back of the second seat and a third back of the third seat with respect to the longitudinal axis; and in the adjusted position, the first back of the first seat is disposed at least partially behind the second back and the third back.

19. The row of seats of claim 18, wherein the seat cushion is configured to move between a first height with respect to a floor of the vehicle and a second height with respect to the floor, the second height being greater than the first height.

20. The row of seats of claim 18, wherein in the adjusted position, the first back is disposed completely behind the second back and the third back.

\* \* \* \* \*